United States Patent [19]

Crawshay

[11] 4,235,256
[45] Nov. 25, 1980

[54] DAMPER ASSEMBLY FOR GAS DUCT

[75] Inventor: Alan Crawshay, Trail, Canada

[73] Assignee: Cominco Ltd., Vancouver, Canada

[21] Appl. No.: 40,001

[22] Filed: May 7, 1979

[51] Int. Cl.³ .................... F16K 3/312; F16K 25/00; F16K 31/124

[52] U.S. Cl. .................. 137/240; 138/94.3; 126/285 A; 251/62; 251/174; 251/328; 277/229; 277/235 R; 277/236

[58] Field of Search .............. 126/285 A; 251/62, 63, 251/174, 175, 326, 328; 138/943; 137/240; 277/229, 235, 236

[56] References Cited

U.S. PATENT DOCUMENTS

| | | | |
|---|---|---|---|
| 2,902,305 | 9/1959 | Poltorak | 277/235 |
| 3,596,874 | 8/1971 | DiSanto | 251/175 |
| 3,894,742 | 7/1975 | Trelease | 277/229 |
| 3,897,932 | 8/1975 | Hale | 251/174 |
| 3,918,471 | 11/1975 | Bedner | 137/240 |
| 3,996,750 | 12/1976 | Brear | 251/63 |
| 3,996,864 | 12/1976 | Jones | 126/285 A |
| 4,022,241 | 5/1977 | Fox | 251/174 |
| 4,043,534 | 8/1977 | Gottshall | 251/174 |
| 4,088,146 | 5/1978 | Hagar | 251/174 |
| 4,093,245 | 6/1978 | Connor | 126/285 A |
| 4,163,458 | 8/1979 | Bachmann | 137/240 |
| 4,176,673 | 12/1979 | Connor | 251/328 |

FOREIGN PATENT DOCUMENTS

| | | | |
|---|---|---|---|
| 675565 | 12/1963 | Canada | 251/328 |
| 707273 | 3/1941 | Fed. Rep. of Germany | 126/285 A |

*Primary Examiner*—Martin P. Schwadron
*Assistant Examiner*—G. L. Walton
*Attorney, Agent, or Firm*—Arne I. Fors; Robert F. Delbridge

[57] ABSTRACT

A damper assembly for closure of a duct for conveying hot corrosive gases is disclosed. The damper assembly comprises a rectangular frame having vertical side members substantially coextensive with and secured to sides of the duct and extending both above and below the duct a distance at least equal to the height of the duct, frame cross members substantially coextensive with and secured to the upper and lower edges of the duct, a top frame cross member spaced from the upper edge of the duct a distance substantially equal to the height of the duct, a damper plate having a length at least twice the height of the duct and a width substantially equal to the width of the frame, said plate having an opening formed therein at one end thereof substantially equal to the duct opening, said damper plate slidably supported within said frame for vertical reciprocal travel whereby the opening in the damper plate can be moved into and out of alignment with the duct, a pair of upper and lower cross-bars pivotally secured to upper and lower ends of said plate respectively mounted in said frame for reciprocal vertical travel therein, piston-cylinder means connected to each end of the upper and lower cross-bars for raising and lowering the cross-bars and damper plate whereby the opening formed in said damper plate can be aligned with the duct, and means for sealing the damper plate against the frame to prevent egress of gas from said duct when said damper plate is in an opened, closed or transitional position.

9 Claims, 9 Drawing Figures

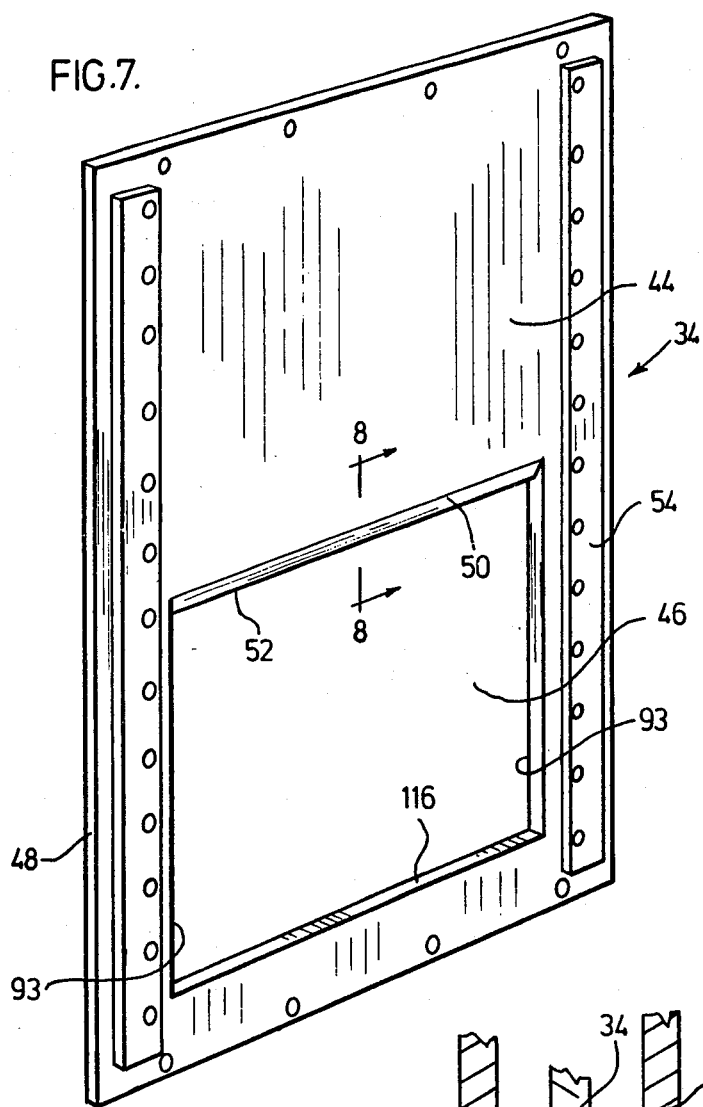
FIG. 7.
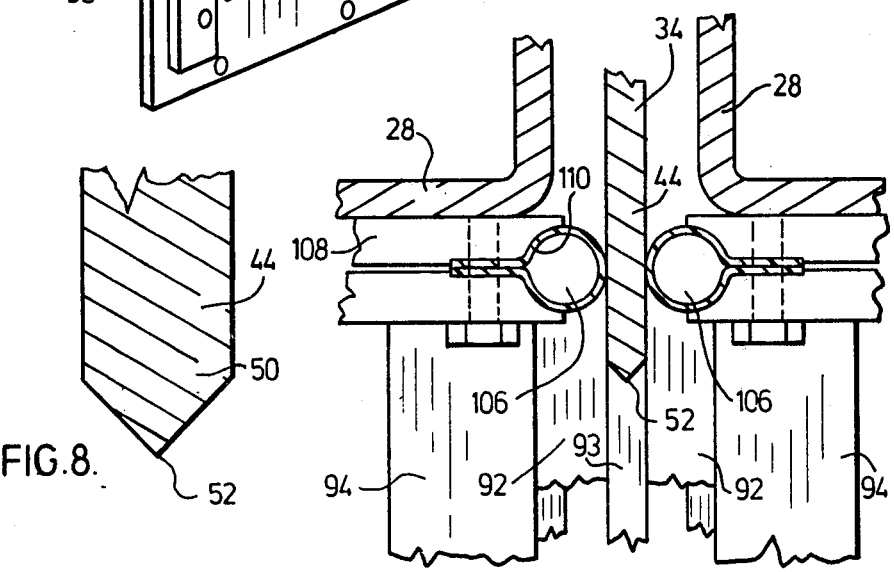
FIG. 8.
FIG. 9.

DAMPER ASSEMBLY FOR GAS DUCT

BACKGROUND OF THE INVENTION

The present invention relates to a damper assembly for closure of a gas duct and in particular is directed to a valve assembly for closure of a duct used for conveying hot, corrosive gas which carries a substantial quantity of dust.

In the oxidation of metal sulphides, e.g., by roasting, sulphur dioxide is evolved which may be used in the manufacture of sulphuric acid. Most of the dust in gas from a roaster is separated in a precipitator before the gas enters a manifold from which gas streams from more than one roaster are passed through scrubbing towers for further cleaning before entering the sulphuric acid making process. Periodically it is desirable to close off one duct to the manifold without interrupting the flow from other ducts and without causing the sulphur dioxide gas to escape to atmosphere or back up into the closed duct. However, since the gas is hot and corrosive and since it carries a substantial quantity of dust which is not removed by the precipitator, usual means of providing duct closure have proven to be ineffective.

In an operation in which a large rectangular cross section duct has been closed by inserting a metal damper plate transversely across the duct, corrosion and dust deposits around the plate have made it difficult to move the plate between open and shut positions. Presence of dust and corrosion products has made it difficult to obtain adequate seals, either between the upstream and downstream parts of the duct or between the interior of the dust and the outer atmosphere. Use of manually operated tools to force the damper plate into either open or closed positions has obviated effective sealing, and use of mechanical driving means has been encumbered by unbalanced forces resulting from uneven deposits of dust and corrosion products. Such unbalanced forces tend to buckle the damper plate.

U.S. Pat. No. 1,953,828 provides a horizontally acting valve which prevents gushing of oil from a well. The valve plate is guided by flanges on upper and lower casing plates as rotation of a threaded shaft moves the plate into open and closed positions.

U.S. Pat. No. 1,979,885 provides a vertically operating gate in a hot gas line. Spring diaphragms spaced about the conduit on one side of a gate plate act against mechanical means applied to the other side of said plate to provide a tight seal on closure and to release the plate for opening. Actuating mechanisms are isolated from the gas to protect them from heat and dust.

The body of the blind assembly of U.S. Pat. No. 2,354,967 for completely blanking off pipe lines has a transverse slot with machined faces. Either a flow controlling member or a blind having peripheral grooves to hold rubber sealing members is inserted into the slot. Flexible lips of the sealing members engage the machined faces of the body so that, with any difference in pressure between the inside and the outside, outer or inner lips will move to make a seal.

The apparatus of U.S. Pat. No. 2,702,178 has a valve plate which is held in position between two disc sealing members which encircle a gas conduit. Difficult operation of the control mechanism due to settling of dust is prevented by having one of the sealing members suspended about its section of conduit with sliding movement along the conduit being controlled by a guiding ring which is between the sealing member and the conduit. This ring and an outwardly bulging elastic member together prevent gas escape.

The slide valve assembly of U.S. Pat. No. 3,047,024 moves vertically between flanged sections of gas lines. The valve gate has a circular orifice to permit gas flow and a solid disc blind which are supported by three coplanar plate sections held together by edge strips. The circular orifice and the solid disc have peripheral grooves which are filled with gasket rings of rubber or with mixed rubber and asbestos to provide gastight seals when the valve is open or closed. Means are provided for exerting pressure on the seals in the direction of the gas line axis. The slide gate may be guided by side rollers mounted in the housing. The operating mechanism is isolated from dust in the gas stream.

The line blind of U.S. Pat. No. 3,099,292 discloses the use of a pivotal flat spectacle plate in combination with a pair of triangular body plates. Sealing is provided by O-rings set into peripheral grooves formed in the end surfaces of aligned pipe sections and wedging means are provided to exert pressure on the rings.

In U.S. Pat. No. 4,043,534, a sliding gate valve for a rectangular cross section gas duct is provided with side sealing means in the form of a resilient metal strip attached to the frame. The side edges of the gate make sealing contact with the spring strip, and slide along the strip when the gate is being closed. A flange mounted on the bottom of the frame and extending inwardly to contact the downstream surface of the gate when the gate is closed provides a bottom seal when upstream fluid pressure presses the gate against the flange. Top edge sealing may be provided by a similar flange or by flat sealing strips mounted on opposing sides of the aperture.

U.S. Pat. No. 4,093,245 provides tadpole tape sealing means at the bottom of a rectangular cross section gas duct. Resilience of the tadpole tape, backed by Z bar mounting, causes shaped shim stock strips to bear against a closed guillotine blade and to bear against each other when the blade is withdrawn.

The foregoing patents are generally directed to the application of mechanical or hydraulic forces along the axis of the conduit to provide tight sealing against stationary baffles and generally do not provide the maintenance of a gas tight seal as the valve plate is being moved between open and closed positions. When the damper plates of U.S. Pat. Nos. 4,043,534 and 4,093,245 are open, there is no protection of sealing means within the ducts against encrustation with solids deposited from the gas stream. Good sealing engagements on closure of the plates are not assured.

The damper assembly of the present invention provides sealing against gas leakage during movement between open and closed positions, provides protection of sealing surfaces against dust encrustation and does not require movement of structural parts towards the plate faces for the application of axial pressure necessary to maintain the seal in the open and closed positions. Other advantages will become apparent as the method and apparatus are described.

SUMMARY OF THE INVENTION

A damper assembly of our invention for use with a rectangular cross section gas duct having a pair of aligned duct sections with opposed open ends of equal height and width spaced apart to define a transverse slot therebetween broadly comprises a rectangular frame having vertical side members substantially coextensive with and secured to sides of the duct and extending both above and below the duct a distance at least equal to the height of the duct, frame cross members substantially coextensive with and secured to the upper and lower edges of the duct, a top frame cross member spaced from the upper edge of the duct a distance substantially equal to the height of the duct, a damper plate having a length at least twice the height of the duct and a width substantially equal to the width of the frame, said plate having an opening formed therein at one end thereof substantially equal to the duct opening, said damper plate slidably supported within said frame for vertical reciprocal travel whereby the opening in the damper plate can be moved into and out of alignment with the duct, a pair of upper and lower cross-bars pivotally secured to upper and lower ends of said plate respectively mounted in said frame for reciprocal vertical travel therein, piston-cylinder means connected to each end of the upper and lower cross-bars for raising and lowering the cross-bars and damper plate whereby the opening formed in said damper plate can be aligned with the duct, and means for sealing the damper plate against the frame to prevent egress of gas from said duct when said damper plate is in an opened, closed or transitional position.

BRIEF DESCRIPTION OF THE DRAWINGS

The damper assembly of the present invention will now be described with reference to the accompanying drawings in which:

FIG. 7 is a perspective view of the damper plate of the invention;

FIG. 8 is a cross section of the knife edge along the upper edge of the damper plate opening taken along line 8—8 of FIG. 7; and FIG. 9 is an enlarged portion of FIG. 4 illustrating upper sealing means.

Like reference characters refer to like parts throughout the description of the drawings.

DESCRIPTION OF THE PREFERRED EMBODIMENTS

Figure 1:
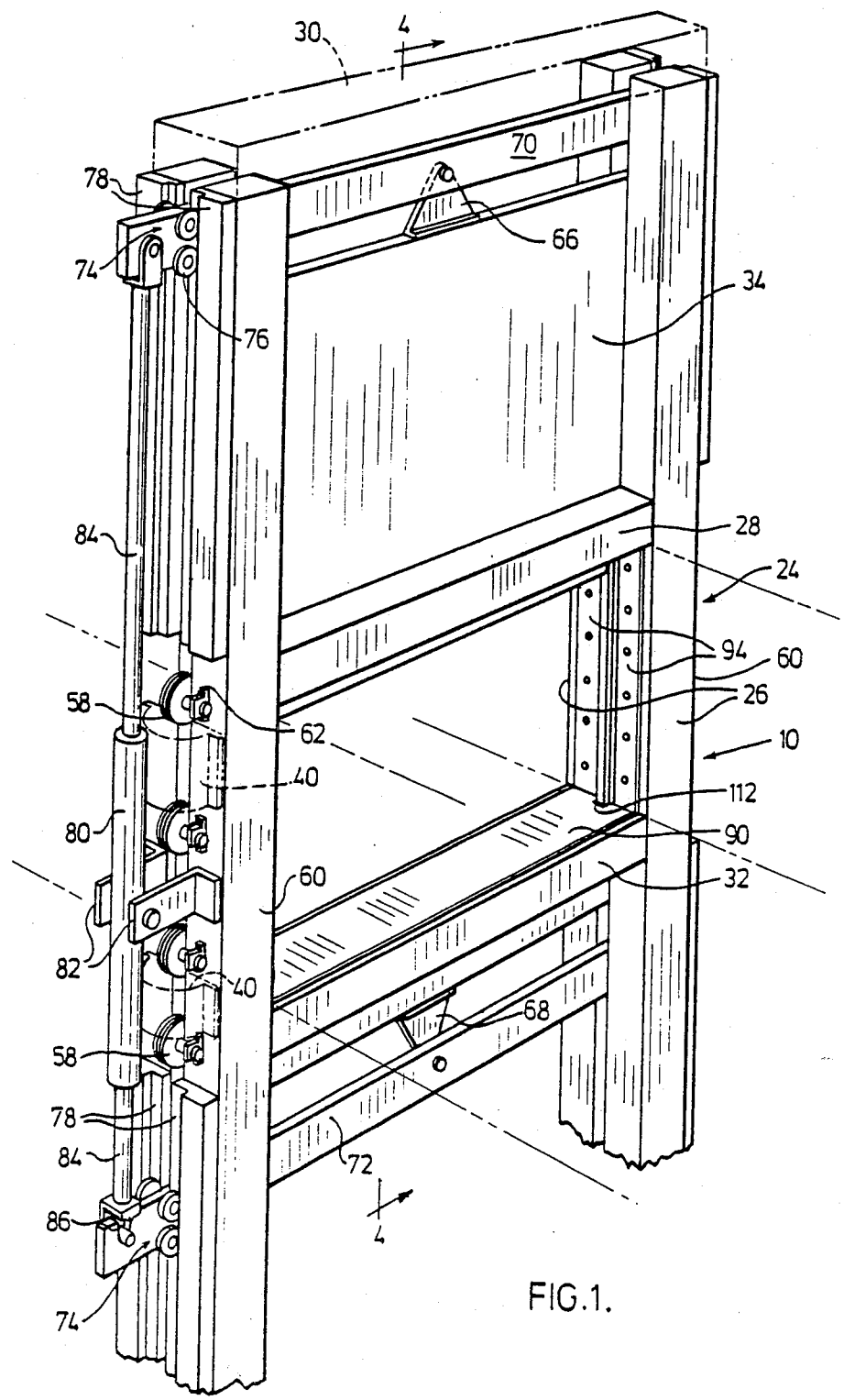
FIG. 1 is a perspective view of the damper assembly of the present invention, mounted between opposing flanges of a gas duct depicted by ghost lines, shown in an open position.
Figure 3:
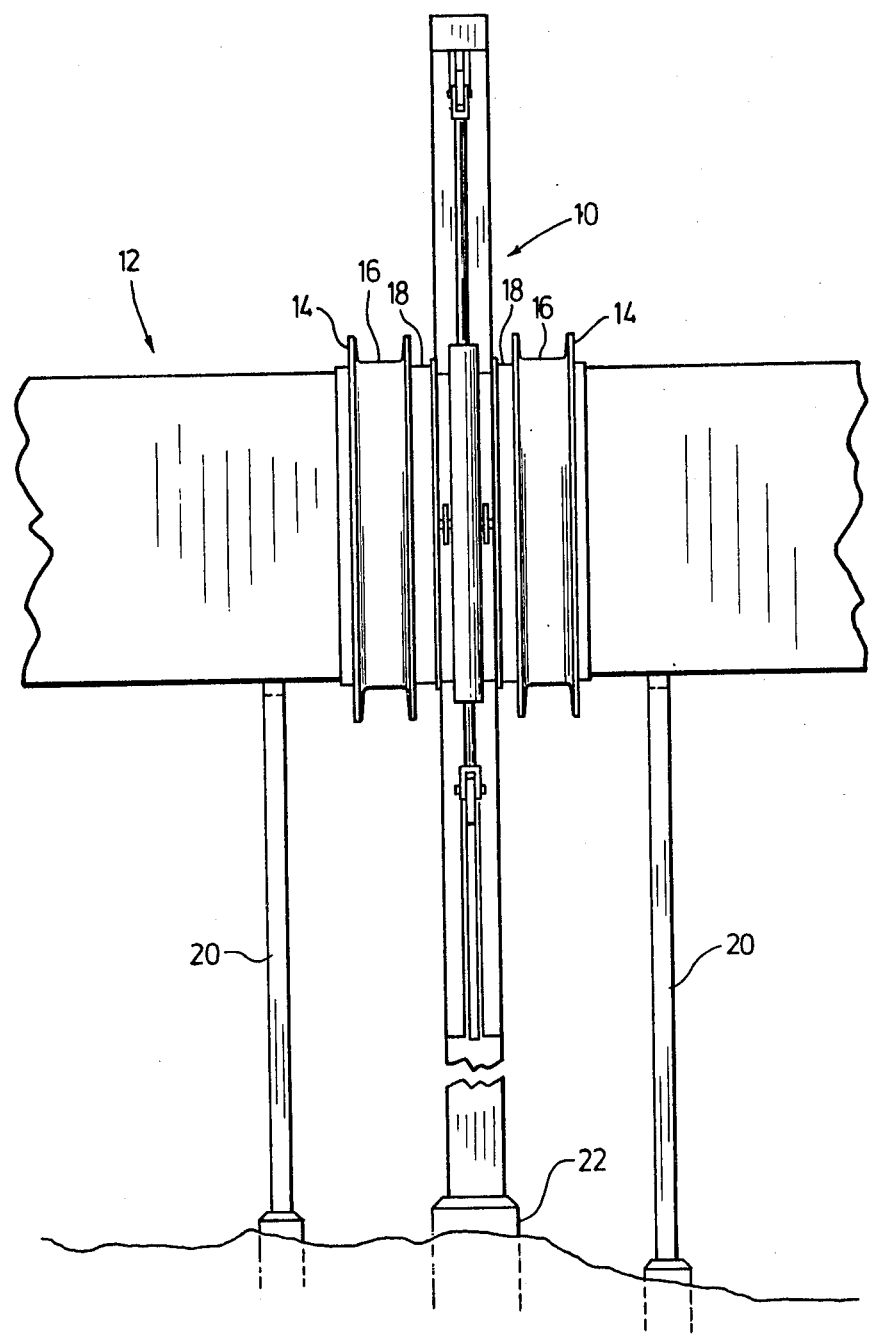
FIG. 3 is a side elevation of the damper assembly shown in FIG. 1, in an open position, illustrating the gas duct with flexible connectors and duct supports.

With reference first to FIG. 1, rectangular frame 10 of the damper assembly of the invention is shown mounted between sections of a gas duct depicted by ghost lines. FIG. 3 illustrates more clearly the relationship between Frame 10 and duct 12 wherein spaced apart and aligned opposing duct flanges 14 define a transverse slot therebetween for receiving frame 10.

Flexible expansion joints 16 are rigidly secured to duct flanges 14 on one side and to flange adapters 18 on the other and the flange adapters in turn secured to frame 10 by a plurality of cap screws, not shown. Duct 12 is supported by posts 20. Damper frame 10 is separately supported by footings 22 and is therefore not affected by stresses that would otherwise be caused by thermal expansion of the duct.

As shown most clearly in FIGS. 1, 2, 4 and 5, frame 10 preferably consists of two spaced-apart pairs 24 of rectangular tubular members 26 defining slot 27 and interconnected by upper, central and lower cross-bars. Central cross-bars 28 at the upper edge of duct 12, and upper and lower cross-bars 30,32 respectively, are rigidly attached to tubular members 26. Central cross-bars 28 and lower cross-bar 32 are aligned with the front and rear faces of members 26 to provide a planar surface for sealing engagement with flange adapters 18. Upper cross-bar 30 is shown by ghost lines in FIG. 1 for clarity of illustration of the underlying components. Each pair 24 of tubular members 26 and central cross-bars 28 are spaced apart as shown by slot 27 in FIGS. 4, 5 and 6 to accommodate the thickness of damper plate 34 and sealing means 36,38 therebetween, to be described. External arcuate reinforcing structures 40, FIGS. 1 and 2, and equi-spaced transverse spacers 42, FIG. 6, are provided to rigidly secure the side members 26 of frame 10 a fixed distance apart.

Damper plate 34, shown most clearly in FIGS. 7 and 8, is formed of a corrosion resistant rigid material, preferably a one-piece stainless steel sheet, having a solid imperforate upper baffle portion 44 which provides closure of the duct and a rectangular opening 46 in the lower portion 48 which can be aligned with rectangular cross section duct 12 to permit gas to flow through the duct. Top edge 50 of damper opening 46 is tapered to provide downwardly pointing knife edge 52 which, on lowering of the damper plate, contributes to improved closure, as hereinafter explained. Reinforcing bars 54 are attached to both faces of damper plate 34 near side edges 56.

Figure 6:
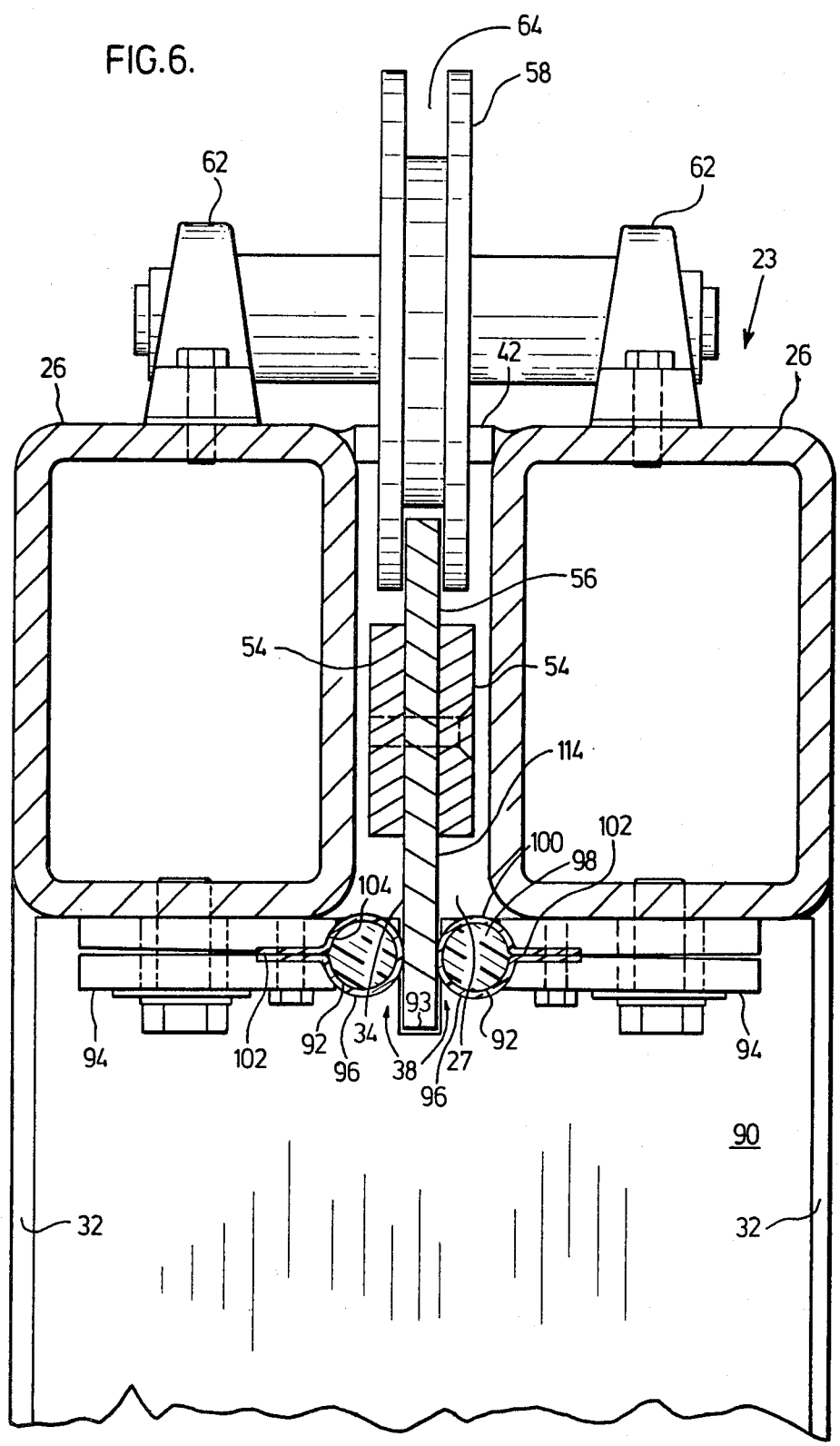
FIG. 6 is a sectional view illustrating a guide roller assembly and side sealing means taken along line 6—6 of FIG. 2.

As shown in detail in FIG. 6, damper plate 34 extends laterally between opposed pairs of tubular members 26 with attached reinforcing side bars 54 being adapted to move freely between members 26. Central location of damper plate 34 between members 26 is provided by guide rollers 58 which are journalled equi-spaced along the central portions 60 of the sides of frame 10 by pairs of pillow block bearings 62. Preferably, side edges 56 of damper plate 34 project beyond guide bars 54 to be engaged by peripheral grooves 64 formed in rollers 58. Grooves 64 are sufficiently wide to accommodate thermal expansion of plate 34.

Figure 2:
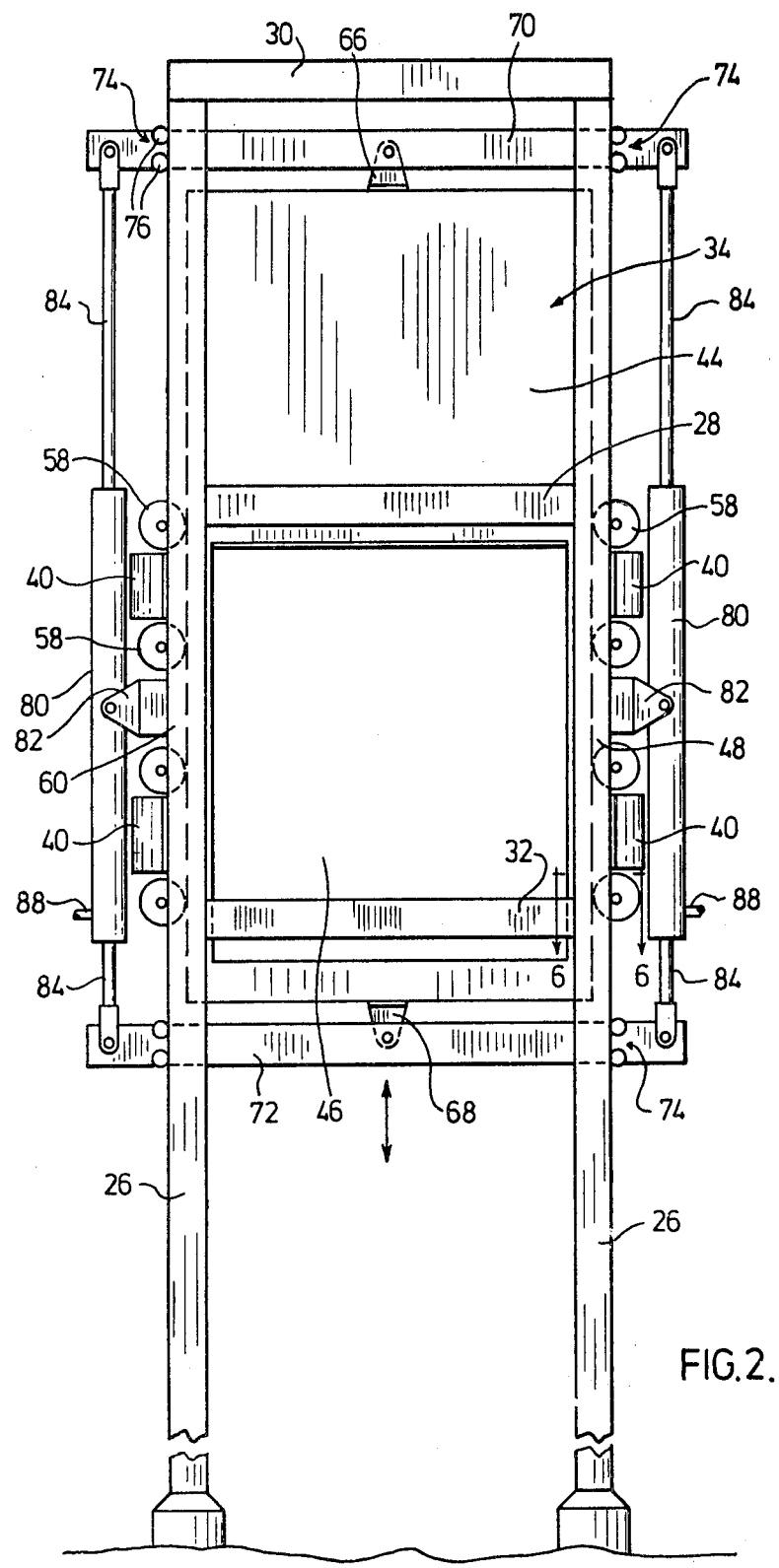
FIG. 2 is a front elevation of the damper assembly shown in FIG. 1 in an open position.

Referring now to FIGS. 1 and 2, brackets 66,68 centrally mounted on the upper and lower edges respectively of damper plate 34 are pivotally attached to upper and lower horizontal support cross-bars 70,72. Roller assemblies 74, each comprising four cam yoke rollers 76, are mounted near the ends of upper and lower cross-bars 70,72 exterior of frame 10 and are spaced to engage parallel, vertical tracks 78 attached to the sides of frame 10 and extending respectively above and below gas duct 12. These rollers provide primary guidance for vertical reciprocal travel of damper plate 34 within frame 10.

Two double-acting hydraulic cylinders 80 are pivotally attached to brackets 82 which in turn are fastened to central portions 60 of the sides of frame 10, as shown most clearly in FIGS. 1 and 2. Piston rods 84 extend through cylinders 80 and engage notches 86 at the ends of upper and lower cross-bars 70,72 by a clevis 87 at each end of rods 84 (shown partly cut away in FIG. 1). Hydraulic activating means, well known in the art and not shown, apply fluid pressure through tubes 88, FIG. 2, to effect selective upward and downward reciprocal movement of damper plate 34. Piston rods 80 exert only pushing forces on the cross-bars. There is no pulling that may impose compressive, buckling force on the damper plate.

Sealing means comprising upper, side and lower means 36,38 and 90 respectively are provided to prevent passage of gas to atmosphere while the damper is open, closed or is being moved between open and closed positions, and to prevent passage of gas between upstream and downstream portions of the duct when the damper is closed. Sealing means 38 on each side of the damper plate is provided by two elongated strips of tadpole tape 92 which are vertically disposed adjacent side edges 93 of plate openings 46 and which are supported by a plurality of rigid holding means 94 mounted along the inner faces of tubular frame members 26. The ends of strips 92 abut the ends of upper sealing means 36 and lower sealing means 90 in a sealing contact. As shown in FIG. 6, tadpole tape 92 comprises cylindrical body portion 96 wherein core 98 is enclosed by cover 100 and a tail portion 102 in which the ends of cover 100 are sealed together. Correspondingly cylindrically curved recesses 104 in holding means 94 partially envelope the body portion to restrain it against lateral displacement. Top sealing means 38 is shown more clearly in FIG. 9, an enlargement of part of FIG. 4. Horizontal strips of the tadpole tape 106 are supported by holding means 108 mounted on underfaces of cross-bars 28 of frame 10, and span the width of baffle portion 44 at a level adjacent the top wall of the gas duct. The tadpole tape strips are adjusted to bear securely against opposite faces of damper plate 34.

On opening or closing of the damper, side strips 92 continuously engage clean face portions of damper plate 34 in paths which are parallel to and adjacent the sides of damper plate opening 46. These paths are covered by the strips at all times. On closing of the damper, the top mounted strips of tadpole tape sweep surfaces of the damper plate which were outside the duct zone. On opening of the damper, dust which may be on the damper plate surface falls into the duct as the plate advances past the horizontal strips. The dust does not accumulate against the strips if a smooth face, corrosion resistant damper plate, e.g., stainless steel, is used. Only a small amount of dust accumulates on a smooth plate while it is in its closed position, and use of stainless steel provides resistance to corrosion that would cause pitting of the surface and increased dust retention.

Tadpole tape for providing seals is commercially available in materials of construction which meet specific temperature and the like operating requirements. It is generally recommended for applications in which sealing surfaces are brought together without relative movement in directions other than that in which contact pressure is applied, e.g. the metal strip enclosed tape of U.S. Pat. No. 4,093,245. For the present application, i.e. the handling of hot, dust-bearing sulphur dioxide, corrosion resistance at high temperatures, low gas permeability, resilience when compressed and an erosion resistant cover are required. Tadpole tape having a stainless steel or INCONEL (Trade Mark for a corrosion resistant nickel-chromium alloy) wire mesh core and covered by woven, wire-reinforced asbestos strands has ability to withstand gas temperatures of 400° C. Sealing of the surface, e.g. with aluminum paint, reduces gas porosity.

As previously stated, the body of the tadpole tape is supported by partial enclosure within complementary recesses 104,110 of the holding means. Because of lateral thrust which tends to dislodge the horizontally disposed top strips as the damper plate is moved, enclosure of about one-half of the diameter of the body of the tape by recesses 110, FIG. 9, is preferred. Since the vertically disposed side tapes are not subjected to this lateral thrust, enclosure of one-third of diameter of the tape by recesses 104, FIG. 6, is sufficient for the side tapes. This is advantageous in that the tape may be compressed to a greater extent in its engagement with the damper plate, thus providing a wider, flattened sealing surface. Tadpole tape having a diameter of 0.75 inch provided effective sealing. A larger diameter, e.g. 1.25 inch, provides more sealing surface and is preferred.

Figure 4:
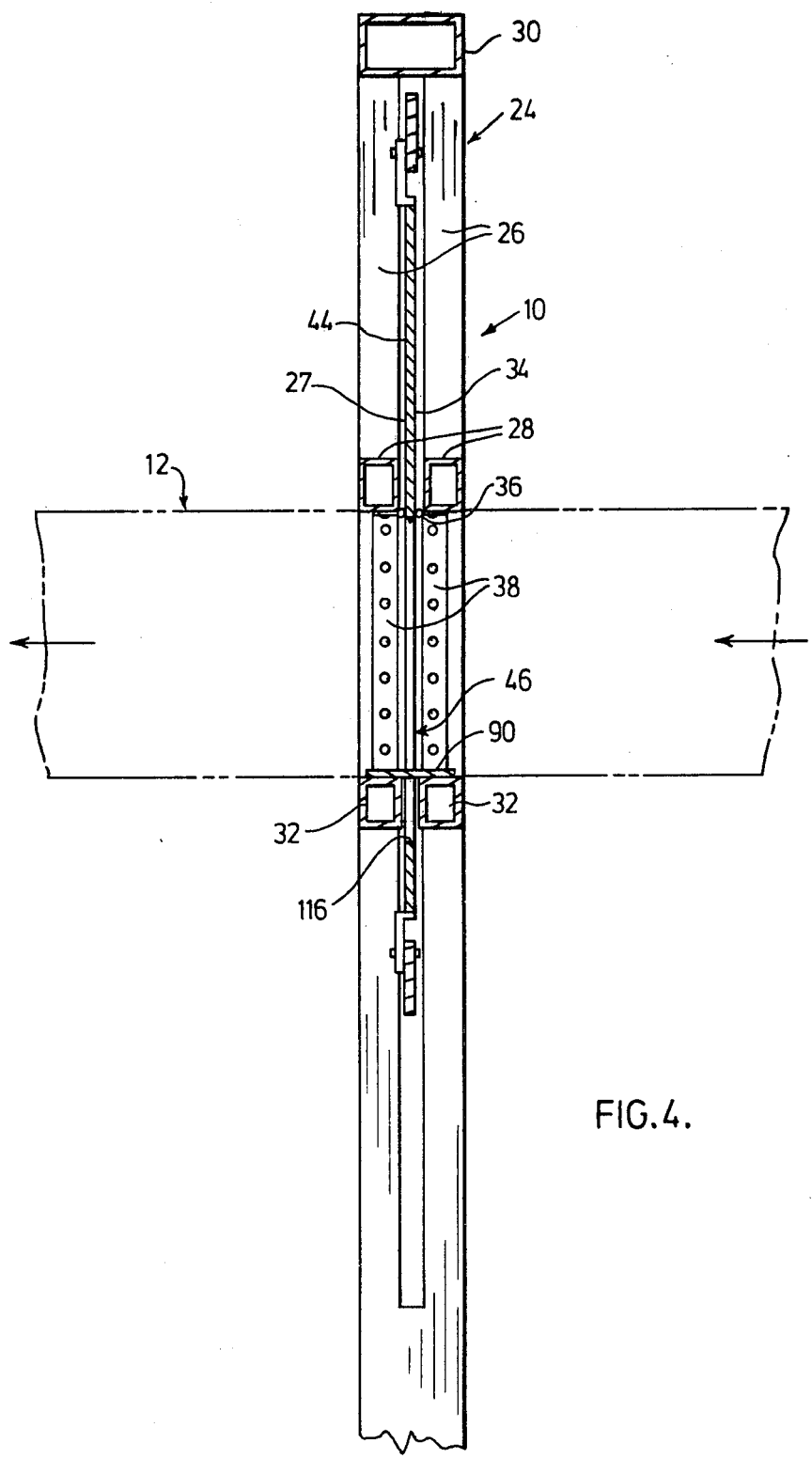
FIG. 4 is a vertical section of the damper assembly, in an open position, taken along line 4—4 of FIG. 1.

When the damper is open, as shown in FIG. 4, bottom sealing to prevent passage of gas to atmosphere is provided by a horizontal corrosion resistant plate 90 mounted on lower cross-bars 32 to span, at the level of the inside of the floor of the duct, the gap within which damper plate 34 moves. A slot 112 at each end of plate 90, FIG. 1, permits vertical travel of the sides 114 of damper plate 34 adjacent the gas flow opening 46 which are in engagement with tadpole tape strips 92. The bottom ends of side strips 92 butt against portions of the cross-bar which enclose the slot, in a gas tight sealing contact. The edges of the slots and the damper plate are in a close fitting arrangement which, with accumulated dust on the duct floor, completes the seal. When the damper is in its elevated open position, the bottom border 116 of gas flow opening 46 is below but adjacent horizontal plate 90.

Figure 5:
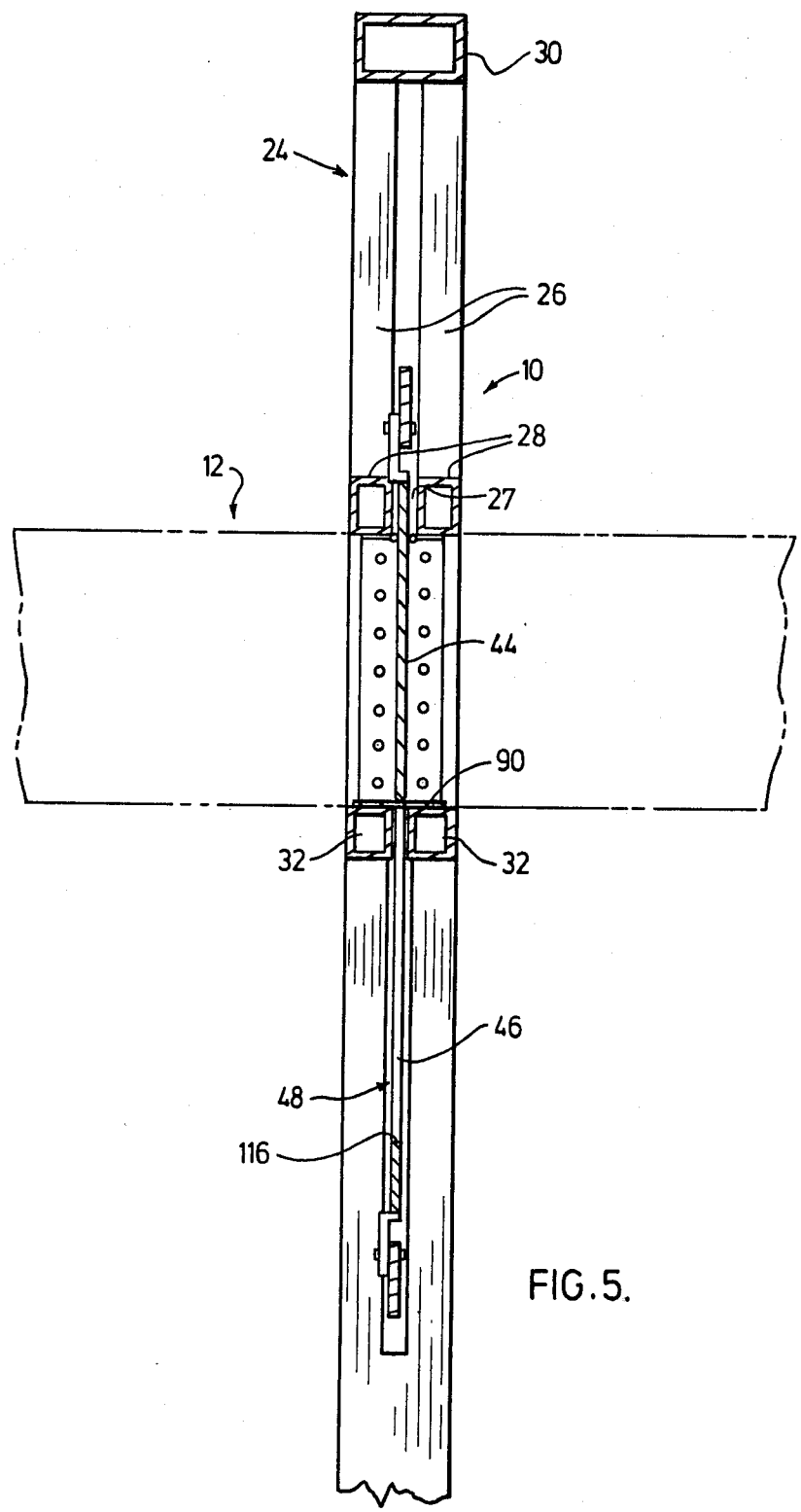
FIG. 5 is a vertical section of the damper assembly corresponding to the view shown in FIG. 4, in a closed position.

Top border 50 of damper plate opening 46 is provided with a knife edge 52 so that, when the plate is lowered, as shown in FIG. 5, the knife edge penetrates into dust which tends to accumulate and cake on the duct floor to form a zone of packed dust between knife edge 52 and horizontal plate 90 to provide an effective bottom seal. Knife edge 52 is machined to engage the full length of a clean plate 90 closely to ensure closure in the absence of dust, and its faces preferably are symmetrical, meeting at a 90° angle.

Damper plate 34 is moved vertically between open and closed positions by action of hydraulic cylinders 80 which push on upper and lower cross-bars 70,72. The hydraulic mechanism, with engagement of the piston rods by slots at the ends of the cross-bars, assures tension on the damper plate during both opening and closing. No compressive forces are exerted on the plate as piston rods retract towards the cylinder. This action, with pivotal mounting and side roller guidance previously described, avoids torques which could buckle the plate, while independent support means for the assembly provides freedom from stresses that might be caused by thermal expansion of the duct.

All guiding means are mounted outside the duct, away from corrosive gases, while corrosion resistant material is used for all parts having contact with the gases. The sealing means prevents passage of gas to atmosphere while the damper is open, closed or is being moved between open and closed positions.

What I claim as new and desire to protect by Letters Patent of the United States is:

1. A damper assembly for use with a rectangular cross section gas duct having upstream and downstream duct sections with opposed open ends of equal height and equal width spaced apart to define a transverse slot therebetween, comprising, in combination, a rectangular frame having vertical side members and horizontal cross members attached thereto to provide a planar surface adapted to be flexibly secured to flanges on said duct members, said vertical side members extending both above and below the duct a distance at least equal to the height of the duct and said horizontal cross members comprising frame cross members substantially coextensive with the upper and lower edges of said flanges and a top frame cross member spaced from the upper edge of the duct a distance substantially equal to the height of the duct, a damper plate having a length at least twice the height of the duct and a width substantially equal to the width of the frame, said plate comprising a lower portion having an opening formed therein at one end thereof substantially equal to the duct opening and an upper baffle portion, said damper plate slidably supported within said frame for vertical reciprocal travel whereby the opening in the damper plate and said baffle portion can be moved into and out of alignment with the duct, a pair of upper and lower cross-bars pivotally secured to upper and lower ends of said plate respectively mounted in said frame for reciprocal vertical travel therein, piston-cylinder means engaging each end of the upper and lower cross-bars for raising and lowering the cross-bars and damper plate whereby the opening formed in said damper plate can be aligned with the duct, and sealing means to prevent egress of gas from said assembly when said damper plate is in an opened, closed or transitional position and to prevent movement of gas between said upstream and downstream sections of the duct when said damper plate is in a closed position.

2. A damper assembly as claimed in claim 1 in which said frame vertical side members each comprises a pair of spaced-apart members and said horizontal cross members coextensive with the upper and lower edges of said flanges each comprises a pair of spaced-apart cross bars, said spaced-apart members and cross-bars defining a slot to accommodate the thickness of said damper plate and sealing means for vertical reciprocal travel of the damper plate therein, said assembly having means for connecting the opposed ends of the duct sections to the abutting frame vertical side and cross members, pulleys journaled on each side of the frame adjacent the sides of the duct for guiding lateral edges of said damper plate between tubular members comprising said spaced-apart members and cross-bars of the frame, upper and side sealing means mounted on said frame for abutting the edges of the damper plate and lower sealing means for spanning the lower spaced-apart cross-bars, and guide means journaled in proximity to the ends of the upper and lower cross-bars for vertical reciprocal linear travel of the baffle plate within the frame.

3. A damper assembly as claimed in claim 1 in which said piston-cylinder means each comprises a double acting cylinder having piston rod extensions projecting from each end of said cylinder, means for engagement of the opposite ends of the piston rods with the ends of the upper and lower cross-bars secured to the damper plate comprising slots near the ends of said cross-bars, and bracket means for pivotally mounting each piston to the sides of the frame.

4. A damper assembly as claimed in claim 3 in which said cross-bars are pivotally connected to central portions of the upper and lower edges of the damper plate.

5. A damper assembly as claimed in claim 4 in which said sealing means comprise compressible tadpole gaskets rigidly secured to inner edges of the opposed tubular frame members whereby the baffle plate is positively engaged on each side thereby.

6. A damper assembly as claimed in claim 5 in which said sealing means comprise rectangular or tubular tadpole tape.

7. A damper assembly as claimed in claim 2 in which guide means for said upper and lower cross-bars each comprises two spaced-apart pairs of opposed rollers journaled on said cross-bars whereby the opposed rollers are adapted to travel in a trackway formed on the exterior sides of the frame vertical members.

8. A damper assembly as claimed in claim 2, said upper sealing means mounted on said cross members coextensive with the upper edges of said flanges to bear against the baffle portion of the plate, said lower sealing means spanning the lower spaced-apart cross-bars, and said side sealing means mounted on said vertical side members to bear against opposite faces of the damper plate adjacent the side edges of the plate opening, the ends of said side sealing means abutting the ends of said upper and lower sealing means, and said lower sealing means having end slots enclosing portions of said faces adjacent the side edges of the plate opening.

9. A damper assembly as claimed in claim 2 in which the top border of the damper plate opening has a knife edge adapted, on closure of the damper plate, to penetrate into any dust layer accumulated on a plate comprising said lower sealing means and form a zone of packed dust on said plate.

* * * * *